(12) United States Patent
Hanemaaijer et al.

(10) Patent No.: US 8,496,838 B2
(45) Date of Patent: Jul. 30, 2013

(54) PROCESSES EMPLOYING MOVABLE PARTICLES

(75) Inventors: Jan Hendrik Hanemaaijer, Oosterbeek (NL); Renze Tjeert Van Houten, Wageningen (NL); Earl Lawrence Vincent Goetheer, Westdorpe (NL)

(73) Assignee: Nederlandse Organisatie voor toegepast-natuurwtenschappelijk Onderzoek TNO, Delft (NL)

( * ) Notice: Subject to any disclaimer, the term of this patent is extended or adjusted under 35 U.S.C. 154(b) by 681 days.

(21) Appl. No.: 11/666,445

(22) PCT Filed: Nov. 1, 2005

(86) PCT No.: PCT/NL2005/000775
§ 371 (c)(1),
(2), (4) Date: Mar. 5, 2008

(87) PCT Pub. No.: WO2006/049495
PCT Pub. Date: May 11, 2006

(65) Prior Publication Data
US 2008/0203020 A1 Aug. 28, 2008

(30) Foreign Application Priority Data
Nov. 2, 2004 (EP) .................................... 04078005

(51) Int. Cl.
*B01D 43/00* (2006.01)
*B01D 15/02* (2006.01)

(52) U.S. Cl.
USPC ............ 210/786; 210/660; 210/780; 210/808

(58) Field of Classification Search
None
See application file for complete search history.

(56) References Cited

U.S. PATENT DOCUMENTS

| 4,055,490 A * | 10/1977 | Hasegawa et al. ............ 210/616 |
| 4,469,600 A | 9/1984 | Frydman et al. |
| 4,479,790 A * | 10/1984 | Bocckino et al. ............... 494/85 |
| 4,569,097 A * | 2/1986 | Echols .................... 15/104.061 |
| 4,663,047 A * | 5/1987 | Krauthausen et al. ........ 210/616 |
| 4,671,909 A * | 6/1987 | Torobin .......................... 264/43 |
| 5,364,534 A * | 11/1994 | Anselme et al. .............. 210/650 |
| 5,872,089 A * | 2/1999 | Lo ................................. 510/247 |
| 6,113,792 A | 9/2000 | Benjamin et al. |
| 2003/0104359 A1 | 6/2003 | Cuthbertson et al. |

FOREIGN PATENT DOCUMENTS
EP 1570889 * 9/2005

* cited by examiner

*Primary Examiner* — Katherine Zalasky
(74) *Attorney, Agent, or Firm* — Hoffmann & Baron, LLP

(57) ABSTRACT

The invention is directed to an industrial process, for instance a process for the separation of compounds from a fluid mixture or a process for cleaning parts of equipment, using movable particles, as well as to said particles per se, which may be used in such processes.

12 Claims, No Drawings

PROCESSES EMPLOYING MOVABLE PARTICLES

This application is the U.S. National Phase of, and Applicants claim priority from, International Application Number PCT/NL2005/000775 filed 1 Nov. 2005 and European Patent Application bearing Serial No. 04078005.8 filed 2 Nov. 2004, which are incorporated herein by reference.

BACKGROUND OF THE INVENTION

The invention is directed to processes using movable particles in a fluid mixture, as well as to said particles per se, which particles may be used in such processes. Processes in which the particles can be employed in accordance with the present invention are for instance processes that involve separation of compounds, catalytic processes, as well as cleaning of process equipment, such as membranes, heat exchangers, etc. and/or controlled release of compounds.

The removal of components from liquid mixtures by contacting the mixture with heterogeneous materials, so as to attain sorption (the term "sorption" including absorption and/or adsorption) from the component on the heterogeneous material gives in practice frequently rise to difficulties in operation, in particular with the separation of the solid materials from the fluid. These difficulties are increased if other solid particles are present in the liquid, such as micro-organisms, which are usually present in biological production processes. With regard to biological production processes, it is at the same time usually very important to remove the products produced by the micro-organisms, because these micro-organisms often suffer from product inhibition, which is noted already at very low concentrations of the product formed. Therefore, the product is preferably removed as quickly as possible at low concentrations. Furthermore, it is highly desired if this removal of product may be carried out with relatively small process amendments, preferably by a single unit-operation. It is thus very important to develop means that can effectively separate compounds from (biological) reaction mixtures and other types of mixtures.

It is an object of the present invention to provide a separation process that meets the above-mentioned requirements.

US-A-2003/0104359 describes a separation method in which target material is coupled to encapsulated microbubbles, which are allowed to float to the surface to form a floating layer.

U.S. Pat. No. 6,035,924 describes a method for casting a metal article in which a molten metal is led through an insulating layer of hollow spheres, floating on a fluidized bed.

SUMMARY OF THE INVENTION

It has been found that the above-mentioned object can be met by an industrial process in which a special type of particles is used, which particles are designed to change their properties so that their response to an external force field, in particular to gravity, may vary during the course of the process. Thus the present invention is directed to an industrial process for the separation of a compound from a fluid mixture, comprising the steps of a) contacting in a container said fluid mixture with at least one compressible particle, whereupon said compound is bound to said particle;
b) changing the pressure of said fluid mixture, whereby the position of said particle in said container changes;
c) separating said particle from said fluid mixture.

DETAILED DESCRIPTION OF THE INVENTION

In one embodiment, the present invention is directed to the use of specific carrier particles, which contain a gas inside a compressible core, which is surrounded by a shell, that is optionally porous. By (de-)compression of the gas contained in the particles due to (de-)compression of the fluid, its gravity changes more than that of the fluid, resulting in downward or upward movement of said particle in said fluid. This phenomenon can be used inter alia in industrial processes for the separation of compounds from a fluid mixture. Also, said particles can be used to (re-)move catalysts or to act as carrier for controlled release products, or to act as cleaner for process equipment, such as membranes, heat exchangers, etc.

By using compressible particles, the density of the particles may be changed by applying a pressure to the contents of the container or changing the pressure of the contents of the container, viz. to the fluid mixture and the particles. The applied or changed pressure causes the density of the particles to change more than the density of the fluid mixture. By result, the particles will sink (when the pressure is increased); or float (when the pressure is decreased). Hence, the pressure allows a control over the movement of the particles within the fluid mixture and container. As a result, the concentration of the particles increases locally, by which they can be separated from the fluid mixture (at the bottom or top of the container, respectively) much more easily, e.g. pumping, skimming, by collecting them using a sieve, or the like. This remarkable feature can further be employed in accordance with the present invention for cleaning (pieces of) process equipment, by allowing the particles to contact the surface of said equipment, after bringing the particles into motion by applying or changing the pressure. Contacting of the surface with the particles may e.g. involve impingement of the particles on the surface, by which the fouling is removed. It is also possible that the fouling is partly absorbed by the particles. By contacting the surface with the particles, fouled surfaces, for instance fouled membranes, can be cleaned in a very efficient way. When the process of the invention is used for removing compounds from fluid mixtures, such mixtures to be treated can be dispersions (including emulsions) and/or solutions of the compound to be separated in a continuous phase.

The bonding of the compound or compounds to the particles may be chemical, physical or both.

After a compound is allowed to attach to the particles, the pressure is changed and subsequently some or all of the particles are collected at a specific or predetermined location in a container or reactor. Subsequently the compound of interest is removed from the particles, e.g. by heating, by dissolving in organic solvents, by pH change, etc. The "clean" (i.e. partially or fully depleted of attached compounds) particles that are thus obtained may be recycled.

The compressible particles for use in the present invention may for instance comprise a core with a gas (such as air or helium) which in some cases might be contained in a flexible, impermeable film, such as natural rubber, synthetic rubbers and elastomers (e.g. nitrile-butadiene rubbers (NBR), ethylene propylene diene monomer (EPDM), butadiene, silicone rubbers, polyethylene (PE), polypropylene (PP), etc.) or other flexible polymers (e.g. polyphenylene oxide (PPO), polytetrafluorethylene (PTFE), polyvinylidene fluoride (PVDF), polyethyleneimine (PEI), polyvinylalcohol (PVA), nylons, etc.).

It is also possible to trap the gas in pores, which pores may be present at the surface of the particles, and which may extend into their inner part. Because the gas is trapped in the pores, it can be compressed when pressure is exerted on the surrounding liquid in accordance with the invention. In that case it is not necessary that the material of the particles themselves needs to be compressible, since the trapped gas provides for the compressive function.

For use in separation processes, the outside of the particles (the shell) preferably has a porous structure, in particular a microporous structure, e.g. with an average pore diameter of about 0.1 µm to 50 µm. The thickness of the shell may vary, e.g. from 1-5000 µm, preferably from 5-500 µm. One way to obtain the desired affinity of the shell for the compound to be removed is by choosing a suitable hydrophobicity or hydrophilicity. This can be achieved e.g. by selecting an appropriate polymeric material, e.g. standard adsorption material, both organic and inorganic. Suitable inorganic materials are for instance zeolites, activated carbon, bentonite, etc. Suitable organic materials are for instance ion exchanger resins or the materials used for chromatography beads. Other options are covalently bound functional groups (like in known adsorptive and chromatographic processes), or the use of extraction liquids captured inside the porous shell structure.

Besides the use of porous particles in which the gas is contained inside a flexible, impermeable film, another possibility is the use of porous particles (either with a symmetric or asymmetric structure) in which the gas is contained within the pores.

The diameter of the particles is typically from 5 to 20 000 µm, in most cases between from 50 to 5 000 µm. An important advantage of the process of the present invention is that the diameter of the particles may be very small, because the separation of the particles from the mixture does not depend exclusively on differentiation by size (e.g. the difference in size of the particles and micro-organisms), such as by filtration. Because the particles may be very small, e.g. 1000 µm or less, with a shell thickness preferably between 5 and 500 µm, the external surface to volume ratio of the particles is very high and thus improved kinetics with respect to mass transfer can be obtained.

The compressible particles of the present invention may be used in a process according to the present invention in a variety of ways.

For instance, the particles may have an adsorptive functionality, where the compounds are adsorbed on the surface of the particles, in particular on the surface of the pores.

It is also possible to provide for absorptive or extractive functionality, by providing a liquid extraction medium in vacuoles present in the shell of the particles. Examples of solvent impregnated carriers are described in EP-A-1 570 889.

In another embodiment, the particles are used as nucleation site for heterogeneous crystallization processes. This is advantageous, because the crystals thus obtained may be separated from the mixture (the mother liquor) relatively easily, regardless of their size. In particular, small crystals can thus be recovered.

In another embodiment, the particles are used for cleaning membranes, which may be present in a membrane module, heat exchangers or other relevant process equipment. Because the particles can be positioned and moved in a controlled manner, they may be directed to locations which need to be cleaned, e.g. the surface of membranes, which may have suffered from fouling.

The process of the present invention can be carried out in various configurations, e.g. in a vessel, inside or outside of tubes, in plate-and-frame structures, and the like.

Apart from batch-wise operation, it is also possible to operate the process in a continuous fashion. The continuous process may be carried out by applying a pressure gradient over a channel. Thus the pressure decrease in the flow direction, which results in the particles of the present invention going up, which facilitates their separation from the mixture. After separation of the particles from the mixture, the compound that is bonded to the particles is removed therefrom, e.g. in the manners described hereinabove.

The present invention may find use in a variety of processes, for instance in biological separation processes, in particular in such processes involving in situ product removal, but also in (waste) water treatment processes, and the like.

The following examples illustrate the present invention.

Example 1

Porous, sponge-like particles made from natural rubber (Taprogge™) having a diameter of ca. 10 000 µm, filled with air, were put in a glass container filled with water. The amount of air was balanced to ensure that the particles just floated at/under the air-water surface.

At increasing the water pressure with only ca. 5 kPa the particles quickly moved downward to the bottom of the container.

Upon releasing the pressure to atmospheric, the particles moved upward to the surface.

It proved possible to apply a specific pressure at which the particles staid floating at a predetermined position between bottom and water surface.

The up/downward movement could be repeated in many cycles; however, after a few days the density of the particles changed as a result of dissolution of air into the water.

Example 2

Example 1 is repeated but now a particle is used that comprises a compressible, balloon-like core filled with air. The material which surrounds the air is impermeable to air. The same behaviour is observed with respect to the movement of the particle in response to pressure applied externally.

Even after one week or more the particle can still be controlled by exerting pressure on the liquid as described.

The invention claimed is:
1. An industrial process, for the separation of a compound from a fluid mixture, comprising the steps of:
   a) contacting in a container said fluid mixture with at least one particle, wherein the at least one particle contains a gas and has a density, whereupon said compound is bound to said particle;
   b) changing the pressure of said fluid mixture, whereby, as a result of changing said pressure, the gas contained in the particles is compressed or decompressed and the density of the particle changes more than that of the fluid mixture, resulting in downward or upward movement of said particle in said fluid mixture; and
   c) separating said particle from said fluid mixture, wherein said particle comprises a compressible balloon-like gas-filled core made of polymeric material and a porous shell.

2. The process according to claim 1, which is followed by a step wherein said particle is subjected to a step wherein said compound is at least partly removed from said particle, optionally followed by a step wherein said particle is recycled.

3. The process according to claim 1, wherein said compound is bound by chemical bonding, physical bonding, or a combination thereof.

4. The process according to claim 1, which is carried out continuously, wherein said container forms a channel and wherein said changing of pressure is obtained by a pressure gradient across said channel.

5. The process according to claim 1, wherein said compound is adsorbed in pores at the surface of said particles.

6. The process according to claim 1, wherein said compound is extracted by a liquid present in the porous shell of the particles.

7. The process according claim 1, wherein said compound is crystallized on the surface of said particles.

8. The process according to claim 1 wherein said particles are used as a nucleation site for heterogeneous crystallization processes.

9. The process according to claim 1 wherein said polymeric material is a natural rubber, a synthetic rubber, an elastomer or a flexible polymer.

10. The process according to claim 1 wherein said polymeric material is a nitrile-butadiene rubber (NBR), ethylene propylene diene monomer (EPDM), butadiene, a silicone rubber, polyethylene (PE), polypropylene (PP), polyphenylene oxide (PPO), polytetrafluorethylene (PTFE), polyvinylidene fluoride (PVDF), polyethyleneimine (PEI), polyvinylalcohol (PVA) or a nylon.

11. The process according to claim 1 wherein said particle has a size less than 1,000 microns.

12. The process according to claim 1 wherein said particle has a size of between 5 and 500 microns.

* * * * *

UNITED STATES PATENT AND TRADEMARK OFFICE
CERTIFICATE OF CORRECTION

PATENT NO.       : 8,496,838 B2
APPLICATION NO.  : 11/666445
DATED            : July 30, 2013
INVENTOR(S)      : Hanemaaijer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this
Fifteenth Day of September, 2015

Michelle K. Lee
*Director of the United States Patent and Trademark Office*